United States Patent [19]

Nakamura et al.

[11] Patent Number: 5,061,042
[45] Date of Patent: Oct. 29, 1991

[54] PHASE RETARDER AND LIQUID CRYSTAL DISPLAY USING THE SAME

[75] Inventors: Kimishige Nakamura, Osaka; Shuji Kitamura, Kyoto; Toyokazu Okada, Osaka; Kazuaki Sakakura, Osaka; Hitoshi Kikui, Osaka; Koji Higashi, Osaka; Keizo Ichinose, Osaka, all of Japan

[73] Assignee: Sumitomo Chemical Co., Ltd., Osaka, Japan

[21] Appl. No.: 642,554

[22] Filed: Jan. 18, 1991

Related U.S. Application Data

[63] Continuation of Ser. No. 387,908, Aug. 1, 1989, abandoned, which is a continuation of Ser. No. 151,334, Feb. 2, 1988, abandoned, and a continuation of Ser. No. 292,996, Jun. 29, 1988, abandoned.

[30] Foreign Application Priority Data

| Feb. 2, 1987 | [JP] | Japan | 62-22985 |
| Apr. 20, 1987 | [JP] | Japan | 62-97014 |
| Jun. 30, 1987 | [JP] | Japan | 62-164801 |
| Jul. 21, 1987 | [JP] | Japan | 62-182849 |
| Sep. 24, 1987 | [JP] | Japan | 62-241979 |
| Nov. 2, 1987 | [JP] | Japan | 62-278080 |
| Apr. 11, 1988 | [JP] | Japan | 63-89478 |
| Jun. 28, 1988 | [JP] | Japan | 63-162114 |

[51] Int. Cl.$^5$ .................................. G02F 1/133
[52] U.S. Cl. .......................... 359/63; 359/73; 359/500
[58] Field of Search .............. 350/337, 339 R, 347 V, 350/347 R, 400, 406; 264/210.7

[56] References Cited

U.S. PATENT DOCUMENTS

| 4,238,443 | 12/1980 | Levy | 264/210.7 |
| 4,419,399 | 12/1983 | Ichikawa et al. | 350/337 |
| 4,427,741 | 1/1984 | Aizawa et al. | 350/337 |
| 4,552,436 | 11/1985 | Kozaki et al. | 350/337 |
| 4,592,623 | 6/1986 | Yamamoto et al. | 350/337 |
| 4,844,569 | 7/1989 | Wada et al. | 350/347 R |
| 4,889,412 | 12/1989 | Clerc et al. | 350/347 R |

FOREIGN PATENT DOCUMENTS

| 0167628 | 1/1986 | European Pat. Off. . |
| 3129162 | 3/1982 | Fed. Rep. of Germany . |
| 3334181 | 3/1984 | Fed. Rep. of Germany . |
| 60-254002 | 12/1985 | Japan . |

Primary Examiner—Stanley D. Miller
Assistant Examiner—Anita Pellman Gross
Attorney, Agent, or Firm—Sughrue, Mion, Zinn, Macpeak & Seas

[57] ABSTRACT

A phase retarder obtained by uniaxially stretching a thermoplastic resin film, whose retardation value ranges from 30 to 1200 nm and whose color difference ΔE* is not more than 30 as defined with the phase retarder being set between crossed polarizers in such a manner that the optical axis thereof makes an angle of 45° with respect to the planes of polarization of the polarizers, and a liquid crystal display using the phase retarder are disclosed. The phase retarder has a fixed optical axis, a retardation value suited for new optical uses including liquid crystal displays, and freedom from optical color unevenness. The liquid crystal display using the phase retarder exhibits markedly improved image quality.

15 Claims, 1 Drawing Sheet

PHASE RETARDER AND LIQUID CRYSTAL DISPLAY USING THE SAME

This is a continuation of application Ser. No. 07/387,908 filed Aug. 1, 1989, which is a continuation of both application Ser. Nos. 07/151,334 filed Feb. 2, 1988, and 07/212,996 filed June 29, 1988, all abandoned.

FIELD OF THE INVENTION

This invention relates to a novel phase retarder, and a polarizing sheet and a liquid crystal display using the same.

BACKGROUND OF THE INVENTION

A phase retarder is a film or sheet showing birefringence. Since a phase retarder has different refractive indices in two directions crossing at right angles to each other, light transmittance by the phase retarder produces light rays whose planes of polarization make a phase difference.

Phase retarders which are currently available on the market and have been in practical use include a so-called λ/4 retarder or quarter retarder having a function to cause incident light having a wavelength of λ to produce a phase difference of λ/4. The quarter retarder is prepared by uniaxially stretching a cellulose acetate-based film. The quarter retarder serves as a circular polarizer when it is combined with a linear polarizer in such a manner that the optical axis thereof makes an angle of 45° with respect to the planes of polarization of the linear polarizer. A linear polarizer is also utilized as anti-glare materials, for example, a VDT (visual display terminal) filter, making use of its function to cut reflected light.

In addition to the above-described cellulose type resins, high polymeric materials which have been recommended to constitute the λ/4 retarder include polyvinyl chloride resins as disclosed in Japanese Patent Publication No. 34477/70 and Japanese Patent Application (OPI) No. 125702/81 (the term "OPI" as used herein means an "unexamined published Japanese patent application"); polycarbonate resins as disclosed in Japanese Patent Publication No. 12190/66 and Japanese Patent Application (OPI) No. 130703/81; polyacrylonitrile resins as disclosed in Japanese Patent Application (OPI) No. 130702/81; polystyrene resins as disclosed in Japanese Patent Application (OPI) No. 125703/81; polyolefin resins as disclosed in Japanese Patent Application (OPI) No. 24502/85; and the like. However, all the conventional phase retarders made of these materials are λ/4 retarders whose retardation value (hereinafter referred to as R value) is in the vicinity of 135 nm. None of the above-cited publications refers to a process for producing a λ/2 retarder or a full retarder. The terminology "R value" as used herein means a product of a thickness (t) of a film or sheet and a birefringence (Δn) of the film or sheet and can be represented by equation:

$$R = \Delta n \times t$$

Recent studies have been directed to application of a λ/2 retarder or a full retarder which causes a phase difference of λ/2 or λ, respectively. Under the present situation, however, there has not yet been proposed any phase retarder having satisfactory quality, that is, having an R value between 200 and 625 nm, preferably between 200 and 350 nm (λ/2 retarder) or between 475 and 625 nm (full retarder) and being free from optical color unevenness.

In liquid crystal display systems, it has been proposed to improve image quality of TN (twisted nematic) type liquid crystal displays, in which nematic liquid crystal molecules have a twisted angle of 90° and a liquid crystal cell is sandwiched by a pair of polarizing sheets with their planes of polarization crossing or being parallel, by interposing a phase retarder between one of the polarizing sheets and the liquid crystal cell, as disclosed in Japanese Patent Application (OPI) Nos. 186937/86 and 26322/85.

To cope with the demands for an increased display capacity and an enlarged display screen, generally called STN (super twisted nematic) type liquid crystal displays have recently been developed, in which the nematic liquid crystal molecules are twisted at an angle of about 180° to 270°. However, the STN type liquid crystal display suffers from coloring ascribed to birefringence of liquid crystal molecules, resulting in the failure of B/W display. In order to solve this problem, it has been suggested that a liquid crystal cell for color removal is added to the STN type liquid crystal cell as an optical compensator to thereby eliminate the color and to enable B/W display, as described, e.g., in the October issue of *Nikkei Micro Device*, 84 (1987). It would be possible, in principle, to use a phase retarder in place of the above-described liquid crystal cell for color removal.

Conventional quarter retarders, however, do not serve for the new uses including these liquid crystal display systems for reasons that 1) the retardation value (hereinafter defined) does not meet with the purposes, 2) the optical axis thereof is not fixed, 3) they suffer considerable optical color unevenness, and the like. That is, it has been keenly demanded to develop a phase retarder having a fixed optical axis, freedom from optical color unevenness and a retardation value between 200 nm and 1000 nm, which would be promising for application to the above-described new optical uses including liquid crystal displays, but none of the state-of-the-art phase retarders satisfies these requirements.

SUMMARY OF THE INVENTION

Accordingly, one object of this invention is to provide a phase retarder having a retardation value in the range of from 200 to 1000 nm, a fixed optical axis, and substantial freedom from optical color unevenness.

This invention relates to a phase retarder obtained by uniaxially stretching a thermoplastic resin film or sheet so as to have a retardation value between 30 and 1200 nm, preferably between 200 and 1000 nm, and more preferably between 200 and 350 nm or between 475 and 625 nm; a color difference ΔE* of not more than 30, preferably not more than 20, and more preferably not more than 10, as defined with the phase retarder being set between crossed polarizers in such a manner that the optical axis thereof makes an angle of 45° with respect to the planes of polarization of the polarizers; and an α-value, as defined hereinafter, of 1.00 or more and preferably 1.03 or more.

This invention further relates to a polarizing sheet composed of the above-described phase retarder and a linear polarizer.

The present invention furthermore relates to a liquid crystal display comprising a liquid crystal cell sandwiched between a pair of polarizing sheets, wherein the above-described phase retarder is provided between the liquid crystal cell and one of the polarizing sheets.

The terminology "retardation value" as used herein means a product of a thickness (d) of a film or sheet and a birefringence (Δn) of the film or sheet (hereinafter referred to as R value).

DETAILED DESCRIPTION OF THE INVENTION

Figure 1:
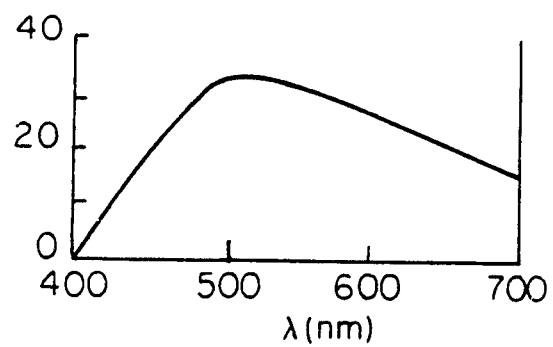
FIGS. 1, 2, and 3 each shows a transmittance light spectrum of background of the STN type liquid crystal display wherein the phase retarder has an α-value of 1.00, 1.03, or 1.06 respectively.

The film or sheet to be used in the present invention as a phase retarder can be prepared from any kind of thermoplastic resins irrespective of whether they are crystalline or amorphous as long as the uniaxially stretched film or sheet obtained therefrom has an average transmittance of at least 50% and preferably at least 80% in the visible wavelength region. In view of transparency and a proper R value, amorphous resins are preferred. Examples of these resins include poly(meth-)acrylate resins, such as polymethyl methacrylate and methyl methacrylate copolymers comprising methyl methacrylate as a main component and other ethylenic comonomers; polystyrene resins, such as polystyrene and styrene copolymers comprising styrene as a main component and other ethylenic comonomers; polyacrylonitrile resins, such as polyacrylonitrile and acrylonitrile copolymers; polyester resins, such as polyethylene terephthalate and polyester copolymers; polyamide resins, such as 6 nylon and 66 nylon; polyvinyl chloride resins, such as polyvinyl chloride and vinyl chloride copolymers; polyvinyl alcohol and derivatives thereof; polyolefin resins, such as polyethylene, polypropylene, ethylene copolymers, and propylene copolymers; polysulfones; polyether sulfones; polycarbonates; fluorine-containing resins; modified resins thereof; and resin compositions prepared by blending the aforesaid resins with transparent low-molecular weight organic compounds or transparent inorganic compounds. These resins may be used either individually or in combinations thereof. Preferred among them are polycarbonate resins, polyester resins, e.g., polyethylene terephthalate and polyester copolymers; polysulfones; polyvinyl chloride resins, e.g., polyvinyl chloride and vinyl chloride copolymers; and polyacrylonitrile resins, e.g., polyacrylonitrile and acrylonitrile copolymers.

The polycarbonate polymer which can be used in the present invention includes straight chain polycarbonates or polycarbonate copolymers having a bisphenol group. The polycarbonate polymers are prepared from 4,4'-dihydroxydiarylalkanes or their halogen substitutes by using the phosgene or ester interchange method and should have a high grade of transparency. As the 4,4'-dihydroxydiarylalkanes and their halogen substitutes for use in the present invention, there are given, for example, 4,4'-dihydroxydiphenylmethane, 4,4'-dihydroxydiphenylethane, 4,4'-dihydroxydiphenylbutane, 4,4'-dihydroxydiphenyl-2,2-propane, 3,3'-dibromo-4,4'-dihydroxydiphenyl-2,2-propane, 3,3'-dichloro-4,4'-dihydroxydiphenyl-2,2-propane, and 3,3',5,5'-tetrabromo-4,4'-dihydroxydiphenyl-2,2-propane.

Besides the above-mentioned polycarbonates or polycarbonate copolymers, blends of these polymers with polystyrene resins are usable in the present invention.

In order to improve image quality of liquid crystal displays, the phase retarder to be used therein is preferably prepared from a thermoplastic resin having an α-value, as defined by equation (1) shown below, of 1.00 or more and preferably 1.03 or more.

$$\alpha = \frac{R_F}{R_D} \quad (1)$$

wherein $R_F$ represents an R value determined using F-line of sodium (486.1 nm); and $R_D$ represents an R value determined by using D-line of sodium (589.3 nm).

When a phase retarder is applied to an STN type liquid crystal display, α-value dependence of image quality is explained below.

When a retarder is set between parallel polarizers in such a manner that the optical axis thereof makes an angle of 45° with respect to the planes of polarization of the polarizers, the transmittance (T) of the optical system is obtained by equation (2):

$$T = T_r \times T_p \times \cos^2 \frac{\pi R_r}{\lambda} \quad (2)$$

wherein $R_r$ represents an R value (nm) of the retarder; λ represents a light wavelength (nm); and $T_r$ and $T_p$ represent transmittances of the retarder and of the parallel polarizers, respectively.

An STN type liquid crystal display composed of a liquid crystal cell containing liquid crystals having a twisted angle of about 200° and an R value [a product of a birefringence (Δn) and a thickness (d)] of about 850 nm, which is sandwiched between parallel polarizers, with a phase retarder having an $R_r$ value of about 550 nm being provided between the upper polarizing sheet and the liquid crystal cell in such a manner that the optical axis thereof makes an angle of about 45° with respect to the planes of polarization of the parallel polarizers, has improved image quality, i.e., it is substantially free from coloring.

Image quality can be judged more excellent as the color of background in the display has a more distinct white color.

Such quality can be attained by satisfying a condition for constant transmittance in the visible wavelength region, i.e., a condition for attaining T=constant in equation (2). Such condition can be represented by equation (3):

$$\frac{\pi R_c}{\lambda} = 0 \quad (3)$$

Accordingly, the $R_c$ value of the birefringent body (a combination of the liquid crystal cell and the phase retarder in this particular case) should satisfy equation (4):

$$R_c = 0 \quad (4)$$

Therefore, a perfect white background in the display can be made, exhibiting satisfactory image quality, if the R value of liquid crystal cell is compensated by $R_r$ of retarder as represented by equation (4) and T is constant throughout the visible wavelength region.

Figure 2:
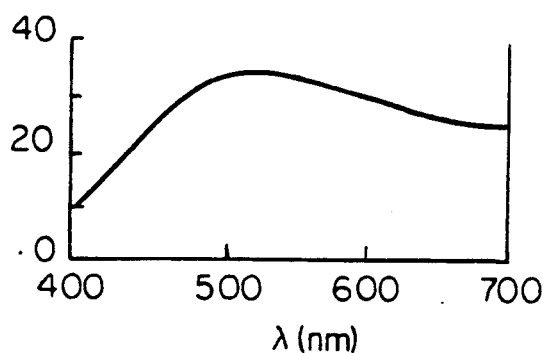
Figure 3:
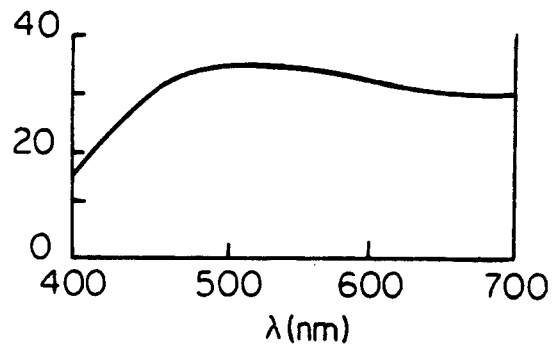

A transmittance spectrum of the STN type liquid crystal display wherein the phase retarder has an α-value of 1.00, 1.03, or 1.06 is shown in FIG. 1, 2, or 3, respectively. As can be seen from these figures, the larger the α-value, the lesser the coloring, approaching to a perfect white display.

As elucidated above, the α-value of a phase retarder to be used in a liquid crystal display is 1.00 or more and preferably 1.03 or more, to thereby attain satisfactory image quality.

Preferred examples of thermoplastic resins having an α-value of 1.03 or more are resins containing an aromatic ring in the main chain thereof, such as polysulfones, polyether sulfones, polyetherether ketones, polyesters, polyarylates, polystyrenes, polycarbonates, and the like; and resins containing a polar functional group in the sequential unit thereof, such as polyvinyl chloride, fluorine-containing polymers, polyacrylonitrile, and the like.

The phase retarder according to the present invention can be obtained by molding the above-described thermoplastic resins into a film or sheet by known techniques, such as solvent casting, calendering or extrusion, and uniaxially stretching the film or sheet to an appropriate degree.

For the purpose of obtaining a phase retarder having a fixed optical axis and being substantially free from optical color unevenness, the film or sheet to be stretched is required to have satisfactory thickness precision and optical uniformity. Formation of die lines, etc. during molding is unfavorable. Since films or sheets generally undergo minute orientation during molding, it is favorable to diminish such minute orientation prior to stretching. The minute orientation can effectively be reduced by subjecting the film or sheet to heat treatment at a temperature in the vicinity of heat distortion temperature of the film or sheet prior to stretching. By effecting such heat treatment, the birefringence ($\Delta n$) of the film or sheet becomes virtually zero, which indicates substantial freedom from orientation.

The uniaxial stretching of the film or sheet can be carried out by conventional methods, such as transverse uniaxial stretching by tentering, compression stretching by rolling, and longitudinal uniaxial stretching between rolls having different peripheral speeds.

In order to obtain a phase retarder free from optical color unevenness and narrow fluctuations of retardation, a neck-in ratio, $100 \times (A-B)/A$, wherein A is a film width before stretching and B is a film width after stretching, should be controlled not to exceed 10%, preferably not to exceed 5%, more preferably be reduced virtually to zero. In this connection, the most effective stretching method is the transverse uniaxial stretching method by tentering that does not cause substantial neck-in.

The transverse uniaxial stretching by tentering generally comprises three steps of preheating, stretching, and heat set. The preheating plays the same role as the above-described heat treatment for reducing the birefringence of the film or sheet to substantially zero. The stretching is the most important for transforming the film or sheet to a phase retarder. Conditions of stretching should be varied depending on the kind of the thermoplastic resin to be used, thickness of the film or sheet, desired $R_r$ value, and the like. The heat set after stretching is effective to improve dimensional stability and retardation evenness of the phase retarder.

The terminology "average transmittance in the visible wavelength region" as used herein means an average value calculated from 31 transmittance values measured at every 10 nm within a wavelength region of from 400 to 700 nm by the use of a spectrophotometer or spectrometer. In order to assure suitability for optical application, the average transmittance of the phase retarder of the present invention is preferably as high as possible and should be at least 50%, preferably at least 80%, and more preferably at least 85%.

The terminology "optical color unevenness" used herein can be expressed quantitatively by $\Delta E^*$ as hereinafter defined. With the phase retarder being set between crossed polarizers in such a manner that the optical axis thereof makes an angle of 45° with respect to the planes of polarization of the polarizers, $L^*$, $a^*$, and $b^*$ of the phase retarder are determined with the transmittance spectrum measured by a spectrophotometer or spectrometer using parallel polarizers as a reference material in accordance with JIS Z 8729 (Specification of Colour of Materials according to the CIE 1976 ($L^*a^*b^*$) Space and the CIE 1976 ($L^*u^*v^*$) Space). The determination is made on n samples from different locations of the film or sheet, and $(\Delta E^*)i,j$ is calculated from the determined values, $L^*$, $a^*$, and $b^*$ according to equation:

$$(\Delta E^*)i,j = [((\Delta L^*)i,j)^2 + ((\Delta a^*)i,j)^2 + ((\Delta b^*)i,j)^2]^{\frac{1}{2}}$$

wherein
$(\Delta L^*)i,j = (L^*)i - (L^*)j$;
$(\Delta a^*)i,j = (a^*)i - (a^*)j$;
$(\Delta b^*)i,j = (b^*)i - (b^*)j$;
$i = 1$ to n;
$j = 1$ to n; and
$i \neq j$.

The highest of the calculated $(\Delta E^*)i,j$ values is taken as $\Delta E^*$. The more the number of measurement (n), the higher the precision of the result. Usually, the measurement is carried out on ten random locations of a sheet or film (30 cm length × 30 cm width) to determine $\Delta E^*$. If a phase retarder has $\Delta E^*$ exceeding 30, color unevenness and a rainbow pattern would be visually observed under crossed polarizers. Such a film can never be used as an optical film.

The $\lambda/2$ retarder according to the present invention has its function controlled to cause a retardation of $\lambda/2$ of an average wavelength of natural light ($\lambda = 550$ nm) and has its retardation controlled so as to fall within a range of from about 200 to about 350 nm and preferably from about 250 to about 300 nm. On the other hand, the full retarder according to the present invention has its function controlled to cause a retardation of an average wavelength of natural light ($\lambda = 550$ nm) and has its retardation controlled so as to fall within a range of from about 475 to about 625 nm and preferably from about 525 to about 575 nm.

Thus, the phase retarder of the present invention causes retardation of $\lambda/2$ or $\lambda$, differing from the conventionally available $\lambda/4$ retarder that causes retardation of $\lambda/4$, and can be utilized in a new application, such as various optics typically including optical filters, and liquid crystal displays.

The thus obtained phase retarder can be applied to novel uses, such as polarizing sheets, liquid crystal displays, optical filters, and the like.

The liquid crystal display according to the present invention comprises a liquid crystal cell sandwiched between a pair of polarizing sheets, wherein the phase retarder according to the present invention is interposed between one of the polarizing sheets and the liquid crystal cell.

The liquid crystal display systems in which the phase retarder of the present invention can be used includes a TN type liquid crystal display using liquid crystal molecules having a twisted angle of 90° and an STN type liquid crystal display using liquid crystal molecules having a twisted angle of from 180° to 270°. Inter alia, the STN type liquid crystal display using the phase retarder of the present invention exhibits markedly improved image quality as compared with the conventional STN type liquid crystal displays.

In applying the phase retarder of the present invention to liquid crystal displays, it is necessary to set its R value to the optimum in accordance with the twisted angle and the birefringence ($\Delta n$) of liquid crystal molecules, the thickness (d) of the liquid crystal cell, and the like.

The image quality can be best conditioned by setting the phase retarder of the invention and the polarizing sheets in such a manner that the optical axis makes an angle of from 30° to 60° and preferably from 40° to 50° with respect to the planes of polarization of the polarizers. Further, the image quality can also be best conditioned by arranging the pair of polarizing sheets in such a manner that their planes of polarization may cross or nearly cross or be parallel or nearly parallel to each other.

The present invention is now illustrated in greater detail with reference to examples in view of comparative examples, but it should be understood that the present invention is not deemed to be limited thereto. In these examples, R values were measured by using a polarizing microscope with a Senarmont compensator at 546 nm. $\Delta E^*$ values were determined by the use of a spectrophotometer and calculated according to the above-described equation. Transmittance spectra were measured by means of a spectrophotometer or a spectrometer and averaged in accordance with the above-described method.

$\alpha$-values of phase retarders as defined by equation (1) were obtained by the use of an Abbe's refractometer in accordance with the following calculations (I) to (IV).

(I) A refractive index in the direction of the optical axis ($n_{D1}$) and a refractive index in the direction perpendicular to the optical axis ($n_{D2}$) were measured using D-line of sodium (589.3 nm) and assigned to equation (5) shown below to calculate an R value at 589.3 nm ($R_D$).

$$R_{D1} = |n_{D1} - n_{D2}| \times d \quad (5)$$

wherein d represents a thickness (nm) of a phase retarder.

(II) An apparent refractive index in the direction of the optical axis ($N_{F1}$) and that in the direction perpendicular to the optical axis ($N_{F2}$) were measured by using F-line of sodium (486.1 nm) and assigned to equations (6) and (7) shown below, respectively, to obtain actual refractive indices ($n_{F1}$) and ($n_{F2}$).

$$n_{F1} = \quad (6)$$

$$n_{F2} = \frac{P \times \sin\left[63° - \sin^{-1}\left(\frac{1.74}{P} \times \sin\left(63° - \sin^{-1}\left(\frac{N_{F1}}{1.74}\right)\right)\right)\right]}{P \times \sin\left[63° - \sin^{-1}\left(\frac{1.74}{P} \times \sin\left(63° - \sin^{-1}\left(\frac{N_{F2}}{1.74}\right)\right)\right)\right]} \quad (7)$$

wherein P represents a refractive index of a main prism of the refractometer at 486.1 nm, measuring 1.7589.

(III) The $n_{F1}$ and $n_{F2}$ values thus obtained are assigned to equation (8) shown below to obtain an R value at 486.1 nm ($R_F$).

$$R_F = |n_{F1} - n_{F2}| \times d \quad (8)$$

wherein d is as defined above.

(IV) The $\alpha$-value can be calculated from the $R_F$ and $R_D$ values according to equations (1).

The present invention is now illustrated in greater detail with reference to examples in view of comparative examples, but it should be understood that the present invention is not deemed to be limited thereto. In these examples, R values were determined by using a polarizing microscope equipped with a Senarmont compensator and a halogen lamp as a light source. $\Delta E^*$ values were determined by the use of a spectrophotometer and calculated according to the above-described equation.

EXAMPLE 1

A transparent polycarbonate extruded film (average molecular weight: 28,000) of 100 μm thick and 200 mm wide was preheated at 180° C. and then subjected to transverse uniaxial stretching by tentering at 170° C. to obtain a stretched film having a thickness of about 58 μm and a width of 340 mm. The resulting stretched film was found to have an R value of about 275 nm and a $\Delta E^*$ of 6.8 with uniform quality, proving usable as a λ/2 retarder.

EXAMPLE 2

In the same manner as described in Example 1, a stretched film having a thickness of about 50 μm and a width of 400 mm was prepared. This stretched film was found to have an R value of about 290 nm and a $\Delta E^*$ of 5.3 with uniform quality, proving usable as a λ/2 retarder.

EXAMPLE 3

A transparent polycarbonate extruded film (average molecular weight: 28,000) of 100 μm thick and 500 mm wide was longitudinally stretched by compression through a pair of rolls (pressure: 500 kg/cm) heated at 170° C. to obtain a stretched film having a thickness of about 60 μm and a width of 480 mm (neck-in ratio: 4%). The resulting film was found to have an R value of about 265 nm and a $\Delta E^*$ of 10.0 with uniform quality, proving employable as a λ/2 retarder.

EXAMPLE 4

A transparent polycarbonate extruded film (average molecular weight: 28,000) of 100 μm thick and 500 mm wide was preheated at 170° C. and then longitudinally stretched by passing between rolls having different peripheral speeds to obtain a stretched film having a thickness of about 60 μm and a width of 465 mm (neck-in ratio: 7%). The resulting film was found to have an R value of about 255 nm and a ΔE* of 14.8 with uniform quality, proving usable as a λ/2 retarder.

COMPARATIVE EXAMPLE 1

The same procedure of Example 4 was repeated, except that the distance between rolls was extended, to obtain a stretched film having a thickness of about 60 μm and a width of 400 mm (neck-in ratio: 20%). The film was found to have an R value of about 230 nm and a ΔE* of 27 and observed to have color unevenness and a rainbow pattern under crossed nicols, proving unemployable as a λ/2 retarder.

COMPARATIVE EXAMPLE 2

The same procedure of Example 4 was repeated, except changing the preheating temperature to 180° C. to obtain a stretched film having a thickness of about 50 μm and a width of 300 mm (neck-in ratio: 40%). The resulting film had an R value of about 80 nm and a ΔE* of 70 and was found to have color unevenness and a rainbow pattern under crossed nicols, proving unusable as a λ/2 retarder.

EXAMPLE 5

A transparent polycarbonate extruded film (average molecular weight: 26,000) of 100 μm thick and 200 mm wide was preheated at 170° C. and subjected to transverse uniaxial stretching by tentering at 160° C. to obtain a stretched film having a thickness of about 50 μm and a width of 400 mm. The resulting stretched film was found to have an R value of about 565 nm and a ΔE* of 8.3 with uniform quality, proving usable as a full retarder.

EXAMPLE 6

In the same manner as described in Example 5, a stretched film having a thickness of about 30 μm and a width of 600 mm was obtained. The stretched film was found to have an R value of about 590 nm and a ΔE* of 5.0 with uniform quality, proving usable as a full retarder.

EXAMPLE 7

A transparent polycarbonate extruded film (average molecular weight: 26,000) of 100 μm thick and 500 mm wide was longitudinally stretched by compressing through a pair of rolls (pressure: 600 kg/cm) heated at 150° C. to obtain a stretched film having a thickness of about 55 μm and a width of 480 mm (neck-in ratio: 4%). The resulting film was found to have an R value of about 540 nm and a ΔE* of 12.7 with uniform quality, proving employable as a full retarder.

EXAMPLE 8

A transparent polycarbonate extruded film (average molecular weight: 26,000) of 100 μm thick and 500 mm wide was preheated at 160° C. and then longitudinally stretched by passing between rolls having different peripheral speeds to obtain a stretched film having a thickness of about 60 μm and a width of 465 mm (neck-in ratio: 7%). The film was found to have an R value of about 500 nm and a ΔE* of 15.1 with uniform quality, proving usable as a full retarder.

COMPARATIVE EXAMPLE 3

The same procedure of Example 8 was repeated, except extending the distance between rolls for longitudinal stretching to obtain a stretched film having a thickness of about 60 μm and a width of 400 mm (neck-in ratio: 20%). The resulting film was found to have an R value of about 500 nm and a ΔE* of 30 and observed to have color unevenness and a rainbow pattern under crossed nicols, proving unusable as a full retarder.

COMPARATIVE EXAMPLE 4

The same procedure of Example 8 was repeated, except preheating the film at 180° C. to obtain a stretched film having a thickness of about 50 μm and a width of 300 mm (neck-in ratio: 40). The resulting film was found to have an R value of about 80 nm and a ΔE* of 70 and observed to suffer color unevenness and a rainbow pattern, proving unemployable as a full retarder.

EXAMPLE 9

An about 200 μm thick and 300 mm wide polyethylene terephthalate film was preheated at about 210° C. and then subjected to transverse uniaxial stretching by tentering at about 195° C. to obtain a stretched film having a thickness of about 140 μm and a width of 430 mm.

The resulting phase retarder was found to have an average transmittance of about 90%, an R value of about 915 nm, a ΔE* of 12.8 and an α-value of about 1.05 with uniform quality and was substantially free from optical color unevenness.

EXAMPLE 10

An about 400 μm thick and 300 mm wide polyester copolymer film ("PETG 6763" produced by Eastman Chemical) Co., Ltd.) was preheated at about 135° C. and then subjected to transverse uniaxial stretching by tentering at about 120° C. to obtain a stretched film having a thickness of about 250 μm and a width of 480 mm.

The resulting phase retarder was found to have an average transmittance of about 89%, an R value of about 535 nm, a ΔE* of 11.0 and an α-value of about 1.06 with uniform quality, and be substantially free from optical color unevenness.

EXAMPLE 11

An about 250 μm thick and 300 mm wide polyvinyl chloride film ("SUNLOID VIP CHA 150" produced by Tsutsunaka Plastic Industry Co., Ltd.) was preheated at about 110° C. and then subjected to transverse uniaxial stretching by tentering at about 100° C. to obtain a stretched film having a thickness of about 140 μm and a width of 540 mm.

The resulting phase retarder was found to have an average transmittance of about 87%, an R value of about 300 nm, a ΔE* of 8.0 and an α-value of about 1.02 with uniform quality, and be substantially free from optical color unevenness.

EXAMPLE 12

An about 150 μm thick and 300 mm wide polysulfone film ("SUMILITE FS-1200" produced by Sumitomo Bakelite Co., Ltd.) was preheated at about 230° C. and then subjected to transverse uniaxial stretching by tentering at about 210° C. to obtain a stretched film having a thickness of about 75 μm and a width of 600 mm.

The resulting phase retarder was found to have an average transmittance of about 89%, an R value of about 590 nm, a ΔE* of 9.5 and an α-value of about 1.10 with uniform quality, and be substantially free from optical color unevenness.

EXAMPLE 13

An about 220 μm thick and 300 mm wide extruded polymethyl methacrylate film ("SUMIPEX-MMO" produced by Sumitomo Chemical Co., Ltd.) was preheated at about 90° C. and then subjected to transverse uniaxial stretching by tentering at about 80° C. to obtain a stretched film having a thickness of about 150 μm and a width of 440 mm.

The resulting phase retarder had an average transmittance of about 90%, an R value of about 570 nm, a ΔE* of 7.2 and an α-value of about 1.01 with uniform quality and be substantially free from optical color unevenness.

EXAMPLE 14

A 60 μm thick low-density polyethylene film ("SUMIKATHENE F-208-1" produced by Sumitomo Chemical Co., Ltd.) was subjected to compression stretching by rolling at a roll surface temperature of about 100° C. under a linear pressure of 250 kg/cm to obtain a stretched film having a thickness of about 15 μm (neck-in ratio: about 3%).

The resulting phase retarder had an average transmittance of about 86%, an R value of about 630 nm, a ΔE* of 14.4 and an α-value of about 1.00 with uniform quality and was substantially free from optical color unevenness.

EXAMPLE 15

The same polysulfone film as used in Example 4 was preheated at 215° C. and then subjected to longitudinal uniaxial stretching between rolls having different peripheral speeds to obtain a stretched film having a thickness of about 70 μm (neck-in ratio: about 6%).

The resulting phase retarder had an average transmittance of about 88%, an R value of about 560 nm, a ΔE* of 15.0 with uniform quality and be substantially free from optical color unevenness.

EXAMPLE 16

A 75 μm thick polyvinyl alcohol film ("Kuraray Vinylon VF-9P75R" produced by Kuraray Co., Ltd.) was stretched by rolling at a roll surface temperature of about 130° C. under a linear pressure of 200 kg/cm² to obtain a stretched film having a thickness of about 16 μm (neck-in ratio: about 13%).

The resulting stretched film, with its both ends being fixed, was dipped in a 7.5 wt %, aqueous solution of boric acid at 65° C. for 3 minutes, followed by drying. Cellulose triacetate films having a thickness of 80 μm ("Fujitack" produced by Fuji Photo Film Co., Ltd.) were laminated on both sides of the stretched film by using a urethane adhesive to obtain a phase retarder.

The resulting phase retarder had a transmittance of about 90%, an R value of about 565 nm, a ΔE* of 9.4, and an α-value of about 1.01 with uniform quality and was substantially free from optical color unevenness.

EXAMPLE 17

An about 300 μm thick and 300 mm wide polycarbonate film (average molecular weight: about 26,000) was preheated at about 185° C. and then subjected to transverse uniaxial stretching by tentering at about 175° C. to obtain a stretched film having a thickness of about 160 μm and a width of 560 mm.

The resulting phase retarder was found to have an average transmittance of about 91%, an R value of about 885 nm, a ΔE* of 9.3, and an α-value of about 1.06 with uniform quality and was substantially free from optical color unevenness.

EXAMPLE 18

An about 200 μm thick and 300 mm wide polycarbonate film (average molecular weight: about 26,000) was preheated at about 190° C. and subjected to transverse uniaxial stretching by tentering at about 175° C., followed by heating at about 180° C. for 2 minutes.

The resulting phase retarder was found to have an average transmittance of about 91%, an R value of about 60 nm, a ΔE* of 13.1, and an α-value of about 1.06 with uniform quality and was substantially free from optical color unevenness.

EXAMPLES 19 TO 27

Each of the phase retarders obtained in Examples 9 to 17 was interposed between a liquid crystal cell and an upper polarizing sheet of a liquid crystal display by the use of an adhesive. The liquid crystal molecules in the cell had a twisted angle of about 200° and a retardation value (Δn×d) of about 850 nm. The resulting display could make a B/W display comprising a black image on a white background with satisfactory image quality, suffering from neither appearance of a rainbow pattern nor color unevenness.

COMPARATIVE EXAMPLE 5

The same procedure of Example 15 was repeated, except that the distance between rolls was extended, to obtain a stretched film having a thickness of about 80 μm (neck-in ratio: about 30%).

The resulting phase retarder had an average transmittance of about 88% and an R value of about 560 nm but was observed to have serious optical color unevenness as having a ΔE* of 32.4. When the phase retarder was used in the same liquid crystal display as described in Example 25, the display suffered from serious color unevenness such as a rainbow pattern, rater exhibiting deteriorated image quality.

COMPARATIVE EXAMPLE 6

A 250 μm thick polyester copolymer film ("PETG 6763") was uniaxially stretched at about 110° C. by the use of the same stretching machine as used in Comparative Example 5 to obtain a stretched film having a thickness of about 170 μm (neck-in ratio: about 40%). The resulting phase retarder had an average transmittance of about 89% and an R value of about 535 nm, but was found to have serious optical color unevenness as having a ΔE* of 34.5. When the phase retarder was used in the same liquid crystal display as described in Example 20, the display suffered from serious color unevenness such as a rainbow pattern, rater exhibiting deteriorated image quality.

While the invention has been described in detail and with reference to specific embodiments thereof, it will be apparent to one skilled in the art that various changes and modifications can be made therein without departing from the spirit and scope thereof.

What is claimed is:

1. A liquid crystal display comprising a liquid crystal cell sandwiched between a pair of polarizing sheets, wherein a phase retarder obtained by uniaxially stretching a thermoplastic resin film, whose retardation value ranges from 30 to 1200 nm and whose color difference ΔE* is not more than 30 as defined with the phase retarder being set between crossed polarizers in such a manner that the optical axis thereof makes an angle of 45° with respect to the planes of polarization of the polarizers is provided between the liquid crystal cell and one of the polarizing sheets.

2. A liquid crystal display comprising a liquid crystal cell containing liquid crystals, said liquid crystal cell being sandwiched between an upper and a lower parallel polarizing sheet, and a phase retarder provided between the upper polarizing sheet and the liquid crystal cell in such a manner that the optical axis thereof makes an angle of about 45° with respect to the planes of polarization of the parallel polarizing sheets, said phase retarder being obtained by uniaxially stretching a thermoplastic resin film, whose retardation value ranges from 30 to 1200 nm whose color difference ΔE* is not more than 30 as defined with the phase retarder being set between crossed polarizers in such a manner that the optical axis thereof makes an angle of 45° with respect to the planes of polarization of the polarizers.

3. A liquid crystal display comprising a liquid crystal cell containing liquid crystals, said liquid crystal cell being sandwiched between an upper and a lower parallel polarizing sheet, and a phase retarder provided between the upper polarizing sheet and the liquid crystal cell in such a manner that the optical axis thereof makes an angle of from 30° to 60° with respect to the planes of polarization of the parallel polarizing sheets, said phase retarder being obtained by uniaxially stretching a thermoplastic resin film, whose retardation value ranges from 30 to 1200 nm and whose color difference ΔE* is not more than 30 as defined with the phase retarder being set between crossed polarizers in such a manner that the optical axis thereof makes an angle of 45° with respect to the planes of polarization of the polarizers.

4. A liquid crystal display as in claim 3, wherein the phase retarder is provided between the upper polarizing sheet and the liquid crystal cell in such a manner that the optical axis thereof makes an angle of from 40° to 50° with respect to the planes of polarization of the parallel polarizing sheets.

5. A polarizing sheet comprising a linear polarizer and a phase retarder obtained by uniaxially stretching a thermoplastic resin film, whose retardation value ranges from 30 to 1200 nm and whose color difference ΔE* is not more than 30 as defined with the phase retarder being set between crossed polarizers in such a manner that the optical axis thereof makes an angle of 45° with respect to the planes of polarization of the polarizers.

6. A phase retarder obtained by uniaxially stretching a thermoplastic film, whose retardation value ranges from 30 to 1200 nm and whose color difference ΔE* is not more than 30 as defined with the phase retarder being set between crossed polarizers in such a manner that the optical axis thereof makes an angle of 45° with respect to the planes of polarization of the polarizers.

7. A phase retarder as claimed in claim 6, wherein said uniaxial stretching is carried out so that the stretched film has a neck-in ratio of not more than 10%.

8. A phase retarder as claimed in claim 6, wherein said uniaxial stretching is carried out by transverse uniaxial stretching by tentering.

9. A phase retarder as claimed claim 6, wherein said thermoplastic resin film has an α-value, as defined by equation (1) shown below, of 1.00 or more $$\alpha = \frac{R_F}{R_D} \qquad (1)$$

wherein $R_F$ represents an R value determined using F-line of sodium (486.1 nm); and $R_D$ represents an R value determined by using D-line of sodium (589.3 nm).

10. A liquid crystal display comprising a liquid crystal cell containing liquid crystals, said liquid crystal cell being sandwiched between an upper and a lower parallel polarizing sheet, and a phase retarder provided between the upper polarizing sheet and the liquid crystal cell in such a manner that the optical axis thereof makes an angle of from 30° to 60° with respect to the planes of polarization of the parallel polarizing sheets, said phase retarder being obtained by uniaxially stretching a polycarbonate film, whose retardation value ranges from about 200 nm to about 625 nm and whose color difference ΔE* is not more than 20 as measured under cross nicols with the phase retarder being set in such a manner that the main optic axis thereof makes an angle of 45° with the crossed nicols.

11. A phase retarder obtained by uniaxially stretching a polycarbonate film, whose retardation value ranges from about 200 nm to about 625 nm and whose color difference ΔE* is not more than 20 as measured under crossed nicols with the phase retarder being set in such a manner that the main optic axis thereof makes an angle of 45 degrees with the crossed nicols.

12. A phase retarder as claimed in claim 11, wherein the retardation value of said phase retarder ranges from about 200 nm to about 350 nm.

13. A phase retarder as claimed in claim 11, wherein the retardation value of said phase retarder ranges from about 475 nm to about 625 nm.

14. A phase retarder as claimed in claim 11, wherein said uniaxial stretching is carried out by transverse stretching by tentering.

15. A phase retarder as claimed in claim 11, wherein said phase retarder obtained by uniaxial stretching has a neck-in ratio of not more than 10%.

* * * * *